W. H. PRATT.
DEVICE FOR MEASURING SPEED.
APPLICATION FILED JULY 31, 1911.
1,092,452.
Patented Apr. 7, 1914.
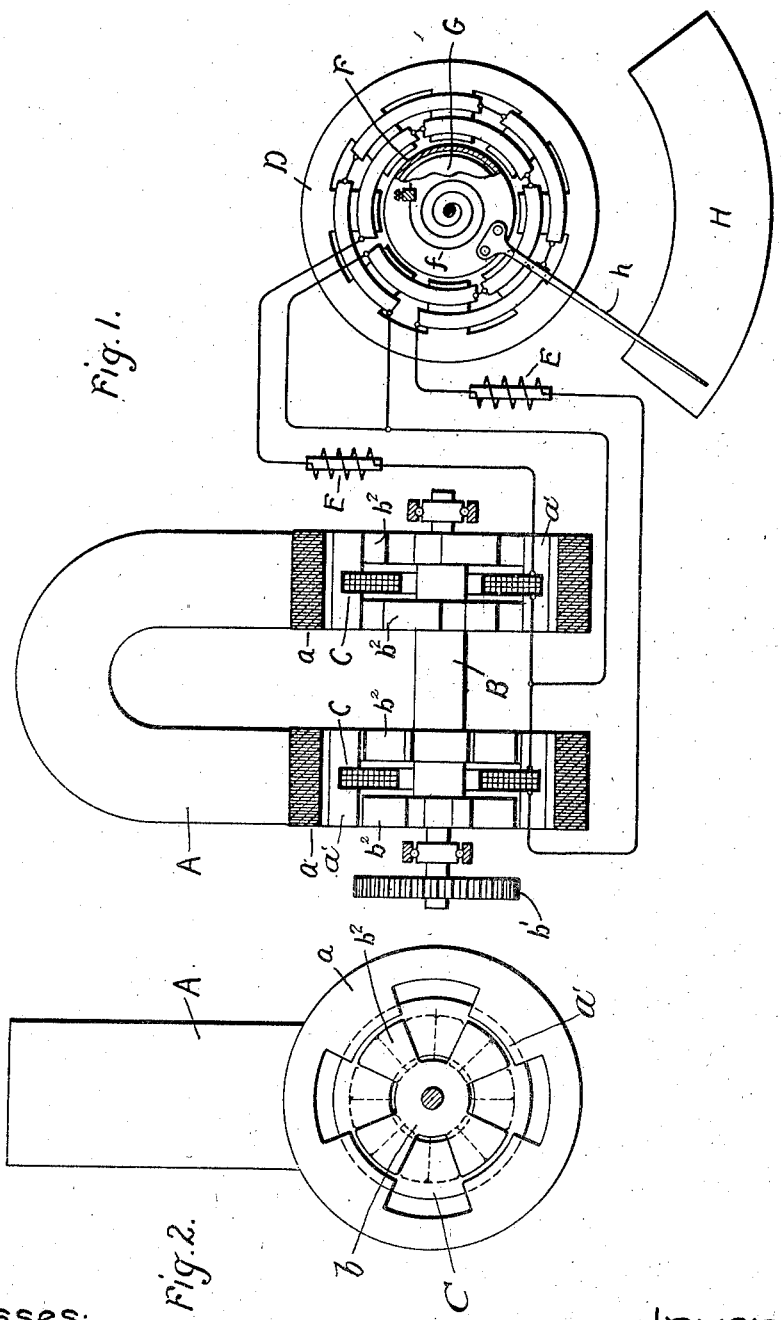
Witnesses:
J. Ellis Glen
J. Earl Ryan
Inventor
William H. Pratt,
by Alfred S. Davis
His Attorney.

UNITED STATES PATENT OFFICE.

WILLIAM H. PRATT, OF LYNN, MASSACHUSETTS, ASSIGNOR TO GENERAL ELECTRIC COMPANY, A CORPORATION OF NEW YORK.

DEVICE FOR MEASURING SPEED.

1,092,452.   Specification of Letters Patent.   Patented Apr. 7, 1914.

Application filed July 31, 1911. Serial No. 641,454.

*To all whom it may concern:*

Be it known that I, WILLIAM H. PRATT, a citizen of the United States, residing at Lynn, county of Essex, State of Massachusetts, have invented certain new and useful Improvements in Devices for Measuring Speed, of which the following is a specification.

My invention relates to the measurement of speed and its object is to provide a simple and reliable device for this purpose.

My invention will best be understood by reference to the accompanying drawing in which—

Figure 1 shows a device for measuring speed arranged in accordance with my invention, the rings $a$ and coils C being shown in section, and Fig. 2 shows an end view of the magneto, shown, partially in cross-section, in Fig. 1.

In the drawings A represents a permanent magnet which forms the field of a small magneto of the inductor type. The poles of this permanent magnet are in the form of rings $a$, $a$ having polar projections $a'$ as clearly shown in Fig. 2. The shaft B of the magneto carries at each end a pair of inductors $b$, $b$. These inductors are also provided with polar projections $b^2$ and the polar projections $b^2$ of each pair are displaced as shown in Fig. 2, so that when the poles of one inductor are opposite the polar projections of the ring $a$, the poles of the other inductor are between these projections. Between the inductors of each pair is located a stationary armature coil C concentric with the shaft. The arrangement of poles on the inductors is such that the flux passing from the permanent magnet A through the ring shaped member $a$ across the air gap and through the inductor poles to the shaft B is directed alternately through, and outside of, each stationary coil C. Thus an alternating voltage is induced in each coil. The poles of each pair of inductors are displaced from each other 90 electrical degrees so that the voltages induced in the two coils C, C are displaced in phase by 90 degrees. In other words the magneto produces two-phase current. The shaft B is provided with the pinion $b'$ or other suitable means for driving the magneto at a speed proportional to that which is to be measured.

In circuit with the coils C, C is connected the two-phase winding of the stator, or primary member, D, of an induction motor device. The circuit of the coils C and of the member D is arranged with high reactance, reactive coils E, E being inserted in the circuit to produce the desired reactance, if the coils of the magneto and the coils of the member D have not sufficient reactance to give the circuit a very low power factor. The purpose of making this circuit highly reactive is to make the current which flows therein substantially constant in strength regardless of the speed of the magneto. Since the field strength of the magneto is constant, both the voltage and frequency of the induced currents vary directly with the speed. If the circuit connected to the coils C, C is highly reactive, the impedance of the circuit varies approximately in proportion to the frequency of the current. As a result of these two facts, the current supplied to the primary member D of the induction motor device is substantially constant in strength, but of a frequency proportional to the speed of the magneto, and consequently to the speed to be measured. The induction motor device is arranged to produce a torque on constant current proportional to the frequency of the current. To this end the rotor or secondary member consists of a copper cup or cylinder F, shown partly in cross-section.

G represents a stationary laminated iron core within the cup or cylinder F. Since the rotor is nonmagnetic, the torque produced upon it by the primary member D is directly proportional to the frequency, the current in the primary member being constant. Rotation of the member F is yieldingly restrained by spiral springs $f$, or by other equivalent means. A pointer or indicator needle $h$ is carried by the member D and moves over a scale on H. Since the torque is directly proportional to the frequency of the current and since the frequency of the current is proportional to the speed to be measured, a uniform movement of the pointer over the scale H is maintained with variation of speed.

It will be seen that the device above described is rugged and reliable because there are no sliding contacts or flexible leads. Furthermore since the effect of ohmic resistance is reduced to a minimum by making the circuits highly reactive, errors due to temperature variations are reduced to a minimum. The effect of temperature variations on the currents induced in the member F may be reduced to a minimum by making this member of a material having a low temperature coefficient.

I do not desire to limit myself to the particular construction and arrangement of parts shown and described, but aim in the appended claims to cover all modifications which are within the scope of my invention.

What I claim as new and desire to secure by Letters Patent of the United States, is:—

1. A device for measuring speed, comprising means for producing an alternating current of a frequency proportional to the speed to be measured, means electrically connected to said current producing means and responsive to changes of frequency of the current, an indicator actuated by said last mentioned means, and means comprising a reactance for maintaining the strength of said current approximately constant.

2. A device for measuring speed, comprising means for producing an alternating current of a frequency proportional to the speed to be measured, an electric circuit connected to said current producing means and including means responsive to changes of frequency of said current, an indicator actuated by said last mentioned means, and means for producing an impedance in said circuit approximately proportional to the frequency of the current.

3. A device for measuring speed, comprising means for producing an alternating current of a frequency proportional to the speed to be measured, an electric circuit connected to said current producing means and including means responsive to changes of frequency of said current, an indicator actuated by said last mentioned means, and means for imparting to said circuit a high reactance for maintaining the strength of the current in the circuit approximately constant.

4. A device for measuring speed, comprising means for producing an alternating current of a frequency proportional to the speed to be measured, an induction motor device energized by said current, means for yieldingly restraining the movement of the rotor of said motor, an indicator actuated by said rotor, and means comprising a reactance for maintaining the strength of said current approximately constant.

5. A device for measuring speed, comprising an alternating current generator of constant field strength arranged to be driven at a speed proportional to the speed to be measured, an electric circuit connected to said generator, an induction motor device having its primary member included in said circuit, means for yieldingly restraining the movement of the rotor of said motor, and means for producing an impedance in said circuit approximately proportional to the frequency of the current.

6. A device for measuring speed, comprising a polyphase generator of constant field strength arranged to be driven at a speed proportional to the speed to be measured, a polyphase circuit connected to said generator, a polyphase induction motor device having its primary member included in said circuit, means for yieldingly restraining the movement of the rotor of said motor, an indicator actuated by said rotor, and means for imparting to said circuit a high reactance for maintaining the strength of the current in the circuit approximately constant.

7. A device for measuring speed, comprising means for producing an alternating current of a frequency proportional to the speed to be measured, an electric circuit connected to said current producing means, electromagnetic means connected to said circuit and actuated by said alternating current and responsive to changes of frequency of said current, reactive coils included in said circuit and adapted to maintain the strength of the current flowing in said circuit approximately independent of the speed to be measured, and an indicator actuated by said electromagnetic means.

8. A device for measuring speed comprising an alternating current generator of constant field strength arranged to be driven at a speed proportional to the speed to be measured, an electric circuit connected to said generator, an induction motor device having its primary member included in said circuit, reactive coils included in said circuit and adapted to maintain the strength of the current flowing in said circuit approximately independent of the speed of said generator, means for yieldingly restraining the movement of the rotor of said induction motor device, and an indicator actuated by the rotor.

In witness whereof, I have hereunto set my hand, this twenty seventh day of July, 1911.

WILLIAM H. PRATT.

Witnesses:
   JOHN A. McMANUS, Jr.,
   OTTO F. PERSSON.